(12) United States Patent
Dutta et al.

(10) Patent No.: US 9,400,854 B2
(45) Date of Patent: Jul. 26, 2016

(54) AEROSPACE JOGGLE ON MULTIPLE ADJACENT WEB FACES WITH INTERSECTING RUNOUTS

(71) Applicant: Siemens Product Lifecycle Management Software Inc., Plano, TX (US)

(72) Inventors: Nabarun Dutta, Pune (IN); David Walker, Hampshire (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 190 days.

(21) Appl. No.: 14/485,096

(22) Filed: Sep. 12, 2014

(65) Prior Publication Data
US 2015/0347631 A1 Dec. 3, 2015

(30) Foreign Application Priority Data
Jun. 3, 2014 (IN) .............................. 608/KOL/2014

(51) Int. Cl.
| | |
|---|---|
| *G06G 7/48* | (2006.01) |
| *G06F 17/50* | (2006.01) |
| *G06T 17/10* | (2006.01) |
| *B21D 5/02* | (2006.01) |
| *G05B 19/4097* | (2006.01) |

(52) U.S. Cl.
CPC *G06F 17/50* (2013.01); *B21D 5/02* (2013.01); *G05B 19/4097* (2013.01); *G06T 17/10* (2013.01)

(58) Field of Classification Search
CPC ....... G06F 17/50; G06F 3/0346; G06T 17/10; G06T 19/00; G05B 19/4097; G05B 19/4099; B21D 5/02
See application file for complete search history.

(56) References Cited

U.S. PATENT DOCUMENTS

| | | | | | |
|---|---|---|---|---|---|
| 5,396,265 | A | * | 3/1995 | Ulrich ................... | G06F 3/0346 345/156 |
| 5,971,589 | A | * | 10/1999 | Hazama ............. | G05B 19/4097 700/145 |

(Continued)

FOREIGN PATENT DOCUMENTS

WO 2014-008220 A1 1/2014

OTHER PUBLICATIONS

PCT Search Report dated Nov. 6, 2015, for PCT Application PCT/US2015/033640, 9 pages.

*Primary Examiner* — Kandasamy Thangavelu (57) ABSTRACT

Methods for CAD modeling and corresponding systems and computer-readable mediums. A method includes receiving a CAD model including a selection of multiple adjacent web faces of the CAD model and at least one datum plane of the CAD model that intersects the web faces, receiving a selection of a joggle side of the CAD model with respect to the datum plane, and receiving an offset direction and an offset depth value corresponding to each selected web face. The method includes creating at least one joggle feature in the CAD model by moving a portion of each of the selected web faces on the joggle side of the CAD model according to the respective offset directions and the depth values, including creating at least one runout for each selected web face at the datum plane, to produce a modified CAD model. The method includes storing the modified CAD model. The multiple adjacent web faces can include intermediate web faces.

20 Claims, 12 Drawing Sheets

(56) References Cited

U.S. PATENT DOCUMENTS

| | | | | |
|---|---|---|---|---|
| 6,144,896 A * | 11/2000 | Kask | ............ | G06T 19/00 700/165 |
| 6,341,243 B1 * | 1/2002 | Bourne | ............ | B21D 5/02 700/145 |
| 6,525,745 B1 * | 2/2003 | Phelan | ............ | G06T 17/10 345/676 |
| 6,542,937 B1 * | 4/2003 | Kask | ............ | G05B 19/4097 700/182 |
| 2006/0059855 A1 * | 3/2006 | Goldenberg | ....... | G05B 19/4099 52/745.19 |
| 2006/0079989 A1 * | 4/2006 | Ishii | ............ | G06F 17/50 700/182 |
| 2006/0106476 A1 | 5/2006 | Tornquist et al. | | |
| 2008/0036761 A1 | 2/2008 | Mazzanti | | |
| 2009/0256842 A1 | 10/2009 | Bohman et al. | | |
| 2009/0326877 A1 * | 12/2009 | Thompson, Jr. | ........ | G06F 17/50 703/1 |
| 2011/0025688 A1 | 2/2011 | Schneider et al. | | |

* cited by examiner

AEROSPACE JOGGLE ON MULTIPLE ADJACENT WEB FACES WITH INTERSECTING RUNOUTS

RELATED APPLICATION

This patent document claims priority under 35 U.S.C. §119 and all other benefits from Indian Provisional Patent Application Serial No. 608/KOL/2014, filed Jun. 3, 2014, titled: "Aerospace Joggle On Multiple Adjacent Web Faces With Intersecting Runouts," the content of which is hereby incorporated by reference to the extent permitted by law.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for CAD modeling and corresponding systems and computer-readable mediums. A method includes receiving a CAD model including a selection of multiple adjacent web faces of the CAD model and at least one datum plane of the CAD model that intersects the web faces. The method receiving a selection of a joggle side of the CAD model with respect to the datum plane and receiving an offset direction and an offset depth value corresponding to each selected web face. The method includes creating at least one joggle feature in the CAD model by moving a portion of each of the selected web faces on the joggle side of the CAD model according to the respective offset directions and the depth values, including creating at least one runout for each selected web face at the datum plane, to produce a modified CAD model. The method includes storing the modified CAD model. The multiple adjacent web faces can include intermediate web faces.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 4A-11C illustrate examples of CAD models and joggle operations with intermediate web faces or multiple adjacent web faces that results in intersecting runouts, in accordance with disclosed embodiments.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In sheet metal design, a "joggle" generally refers to a small, localized offset of a portion of the web area of the sheet metal along with its associated bend area, that allows the offset portion of the web and associated bend to either protrude or recede with regard to its surrounding area while maintaining a flush surface. A joggle feature is a CAD-based modelling operation mainly used in the aerospace industry in the design of deformations in parts like the fuselage, etc., that are manufactured using techniques typical to the industry, including but not limited to stamping processes.

Disclosed embodiments enable a user to select multiple adjacent web faces, separated by a bend region, for a joggle along a datum plane that results in intersecting runouts. Disclosed embodiments can also allow a joggle to be placed on intermediate web faces over and above the end web faces only.

Figure 1:
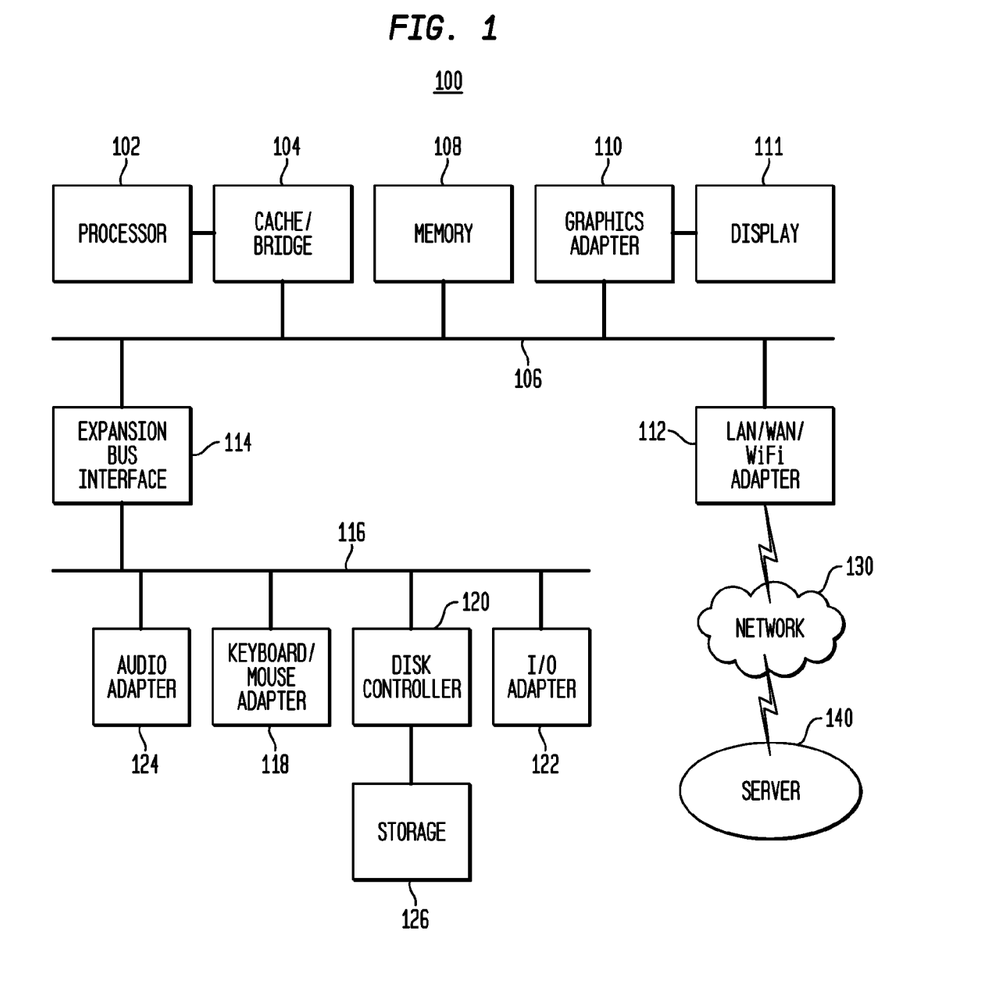
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed. The operating system can be modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
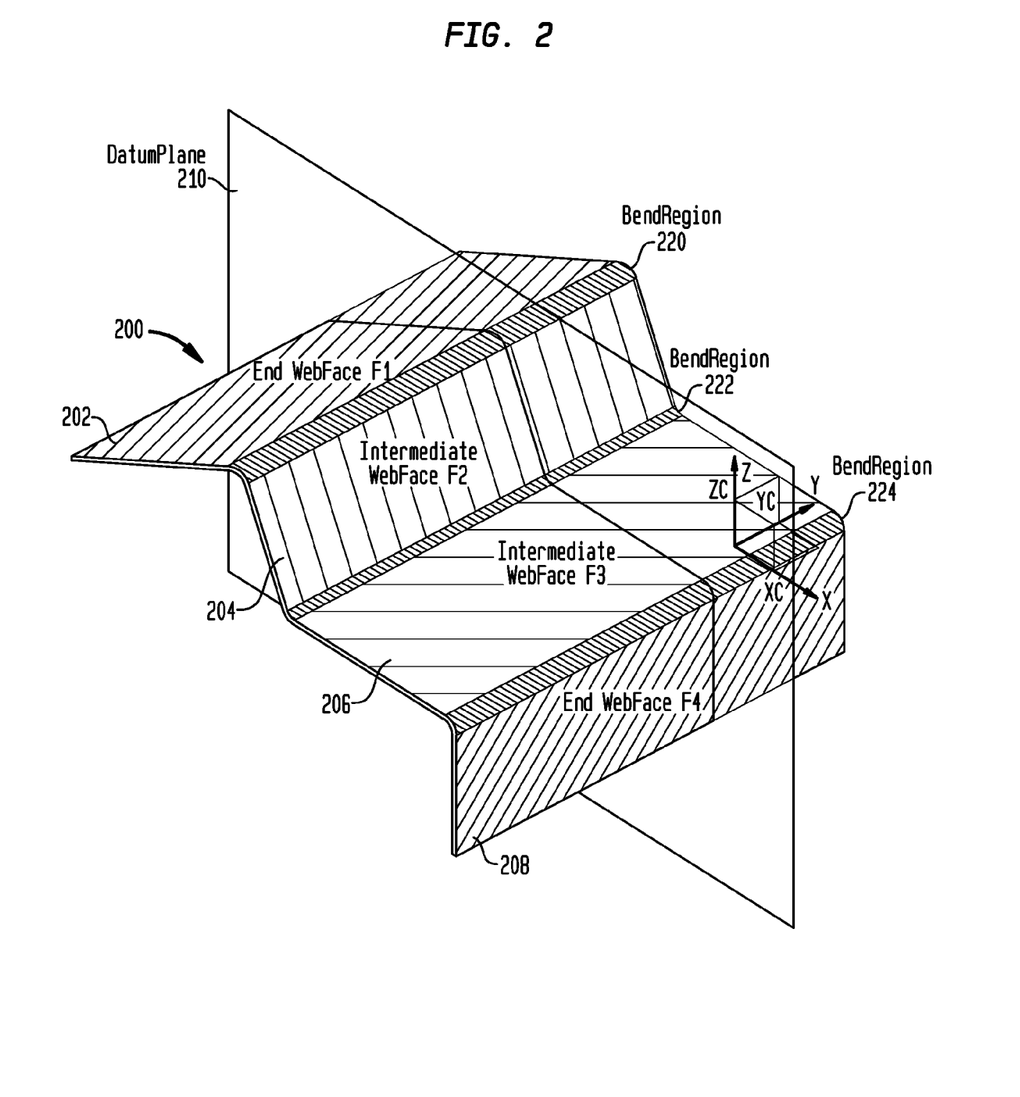
FIGS. 2 and 3 illustrate terms and concepts, including "intermediate web faces," "end web faces," "multiple adjacent web faces," and "intersecting runouts" in accordance with disclosed embodiments.
Figure 3:
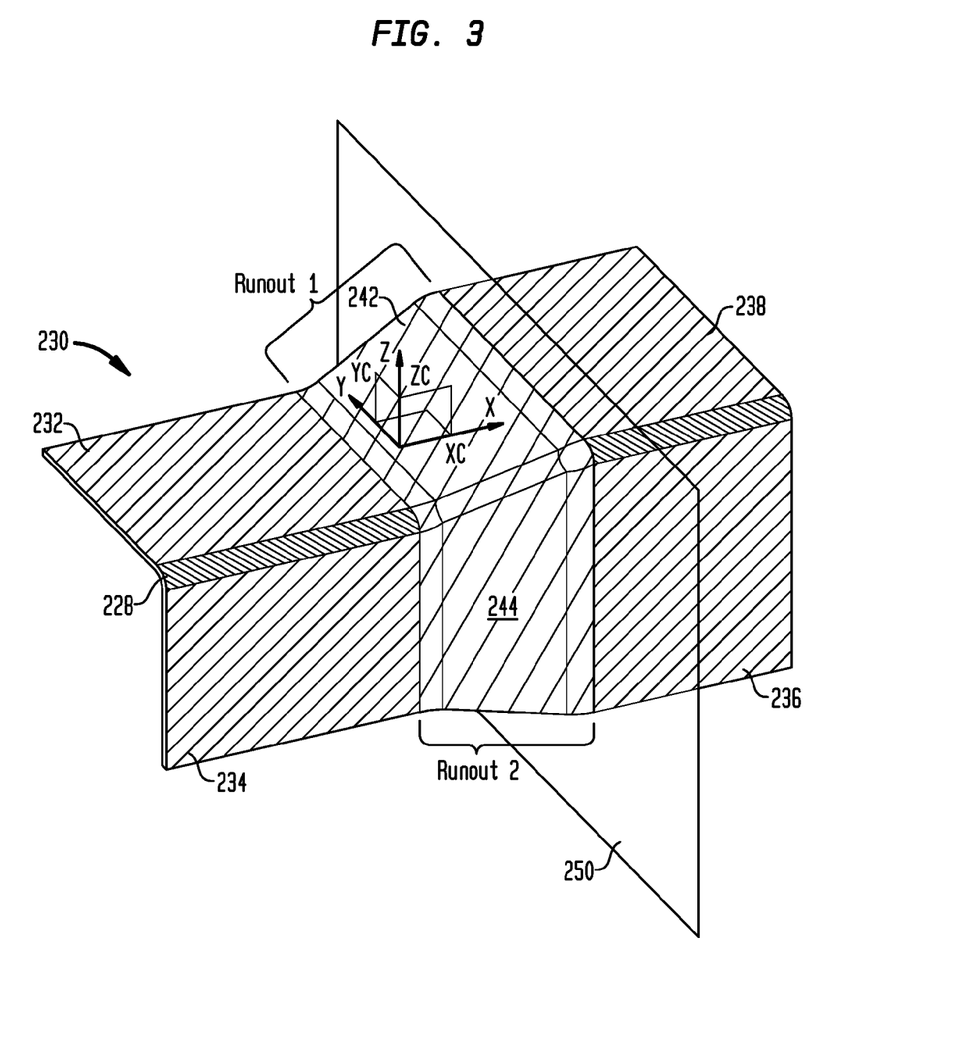

Specific terms, as used herein, are described below. FIGS. 2 and 3 illustrate terms and concepts used herein.

FIG. 2 illustrates a sheet metal body model 200. A "web face" refers to a sheet metal face in sheet metal body of a CAD model, such as web faces 202, 204, 206, and 208, and any two adjacent web faces are typically separated by a "bend region," such as bend regions 220, 222, and 224. A "datum plane" refers to CAD Plane that visually looks finite but is geometrically infinite, such as datum plane 210. The datum plane is not a direct part or component of the CAD model itself but helps in constructing the CAD model. In the context of the joggle processes described herein, all the selected web faces must intersect with the selected datum plane for the input to be valid.

For a given combination of a sheet metal body with multiple web faces and the position of the selected datum plane as illustrated in FIG. 2, the "end web faces" are the extreme web faces that are intersected by the datum plane, such as end web faces 202 and 208. For a given combination of a body with multiple web faces and the position of the selected datum plane, the "intermediate web faces" are the ones that lie in between the extreme end web faces and are intersected by the datum plane, such as intermediate web faces 204 and 206. For a body with only two web faces, there is no intermediate web face.

The input CAD model can have any number of web faces in it, and can have any number of selected webfaces for joggle, including in particular intermediate web faces. If multiple web faces are selected they can also be adjacent to each other with a common bend region in between.

FIG. 3 illustrates a sheet metal body model 230. A "runout" or "runout region" is a transition region between the two split portions of the web face (namely the stationary and offset portions or "sides" as described herein) formed by a joggle, such as runout 242 between the two split portions of the web face illustrated as stationary side 232 and joggle side 238, and such as runout 244 between the two split portions of the web face illustrated as stationary side 234 and joggle side 236. When multiple adjacent web faces, separated by a bend region, are selected for joggle along a single datum plane (such as datum plane 250) or twin datum planes, the runout region (also called the transition region) created on each web face due to the offsetting will intersect with its neighboring runout region along the common bend region; for example, in FIG. 3, runout 242 intersects with runout 244 along bend region 228.

The "stationary side" of the joggle is that side or portion of the body across the selected datum plane that is largely unaffected by the joggle operation. The stationary side of the joggle topologically comprises the stationary portions of all the selected web faces and the in-between bend regions. The stationary side also accommodates the runout regions created on each web face. The "joggle side" (also called the "offset side") of the joggle is that side or portion of the body across the selected datum plane that is offset by the joggle operation. The joggle side of the joggle topologically comprises the offset portions of all the selected web faces and the in-between bend regions.

According to disclosed embodiments, the stationary side or the joggle side is not defined separately for each web face but for the entire selection of web faces. In certain embodiments, the input selection of the stationary side or joggle side can be received in the form of the joggle side direction vector with regard to the datum plane, for single datum plane cases, and the stationary side is derived from that input as the other side. For twin datum plane cases, the stationary side or the joggle side can be automatically determined. The portion that lays in between the two datum planes forms the joggle side while the outer two sides are stationary sides.

Disclosed embodiments include systems and methods for automatically generating a joggle feature between multiple adjacent web faces, separated by bend region(s), along a single datum plane or twin datum planes that results in one or more intersecting runouts. Disclosed embodiments can allow intermediate web faces in addition to end web faces for the joggle along a single datum plane or twin datum planes.

Disclosed embodiments can also allow the user to define separate offset directions and offset depth values for each selected web face when forming the joggle.

A large number of topological combinations are possible by combining the above capabilities.

FIGS. 4A-8B illustrate examples of CAD models and operations in accordance with disclosed embodiments.

Figure 4A:
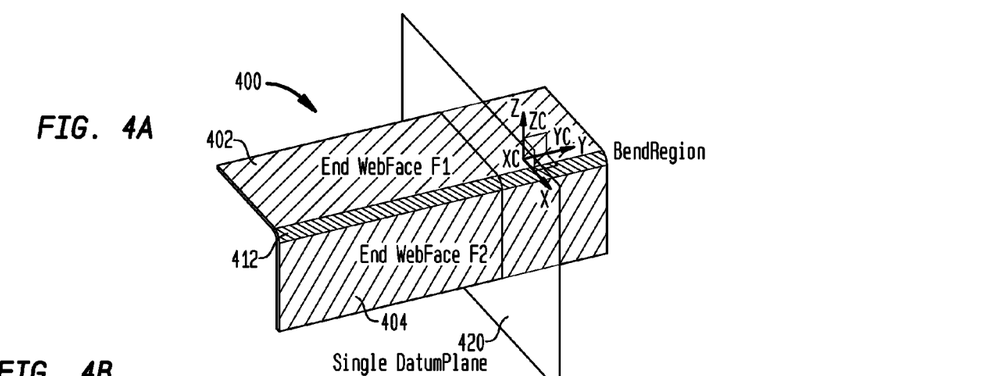
Figure 4B:
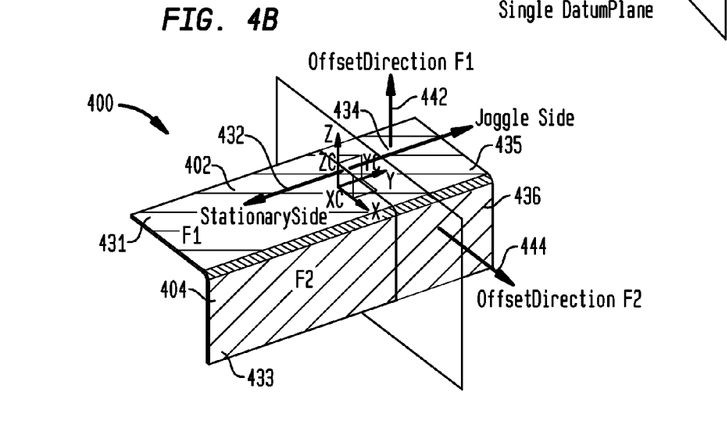
Figure 4C:
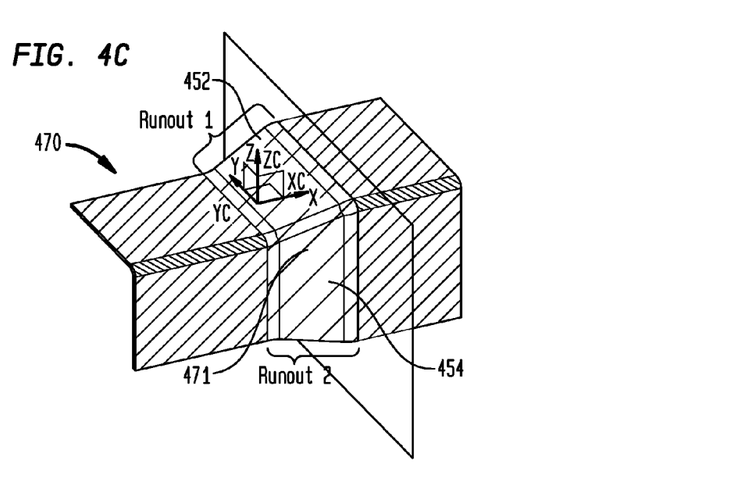

FIG. 4A illustrates a CAD model 400 to which a joggle feature is to be added. FIG. 4B illustrates user selections for the joggle feature that are received by the system. FIG. 4C illustrates a modified CAD model 470 including a joggle feature.

FIG. 4A includes the CAD model 400 having a plurality of adjacent web faces 402 and 404 connected by a bend region 412. CAD model 400 also includes at least one datum plane 420, which may or may not be visible in the model.

FIG. 4B illustrates user selections that can be received by the system, including a selection of web faces 402 and 404, and a stationary side 432 (including web face portions 431 and 433) or a joggle side 434 (including web face portions 435 and 436). The system can also receive one or more offset directions 442 and 444 and offset depth values, each generally associated with a respective web face. Note that a plurality of adjacent web faces are selected for inclusion in the joggle processing, along with the corresponding bend region.

FIG. 4C illustrates a modified CAD model 470 including a joggle feature 471. After the system has received the user selections, the system can create a joggle feature 471 at the datum plane. In doing so, the system can transform a portion of each web face on the joggle side according to the selected offset directions and offset depth values, and create respective intersecting runouts 452 and 454 between the stationary side and joggle side of each web face and between the respective bend regions.

Figures 5A, 5B:
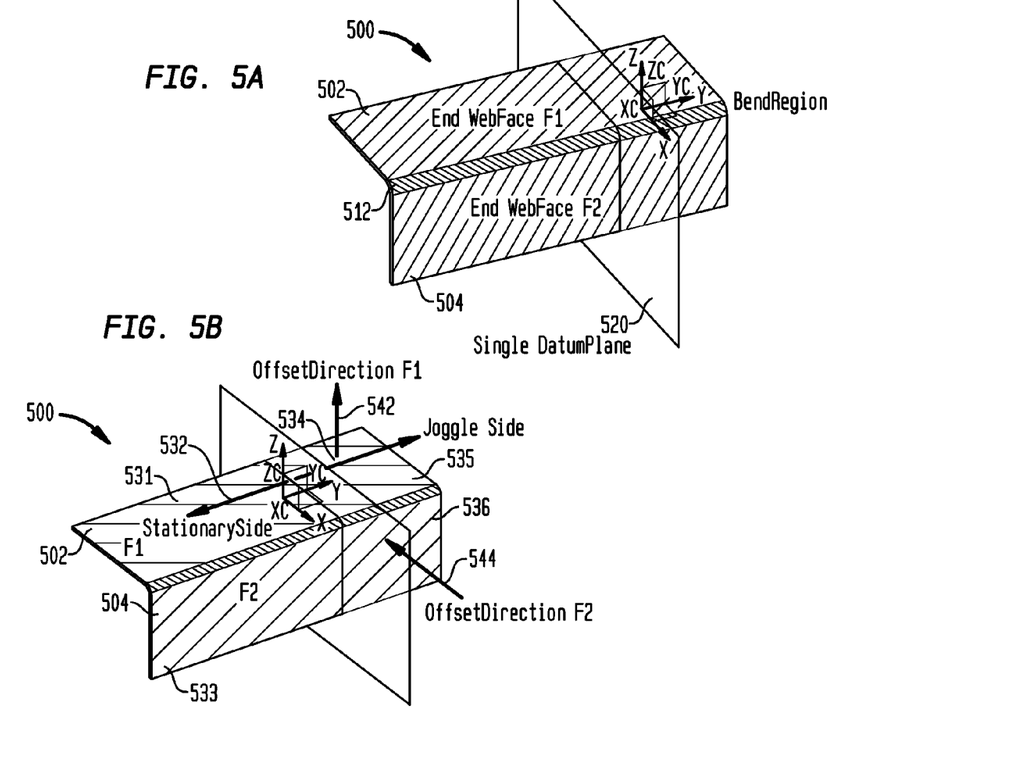
Figure 5C:
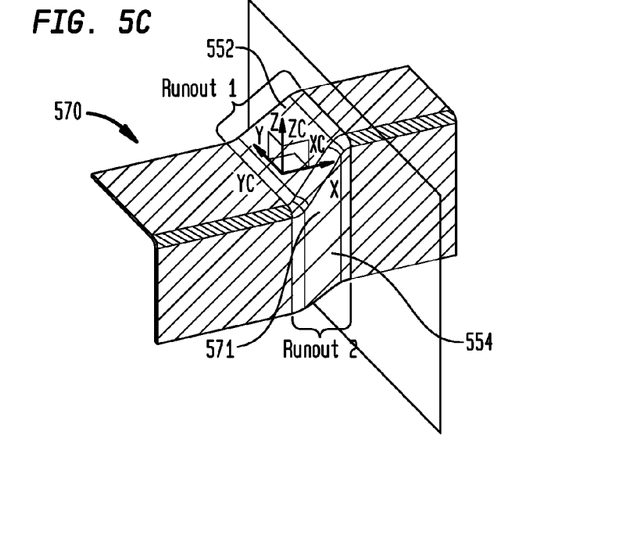

FIG. 5A illustrates a CAD model 500 to which a joggle feature is to be added. FIG. 5B illustrates user selections for the joggle feature that are received by the system. FIG. 5C illustrates a modified CAD model 570 including a joggle feature.

FIG. 5A includes the CAD model 500 having a plurality of adjacent web faces 502 and 504 connected by a bend region 512. CAD model 500 also includes at least one datum plane 520, which may or may not be visible in the model.

FIG. 5B illustrates user selections that can be received by the system, including a selection of web faces 502 and 504, and a stationary side 532 (including web face portions 531 and 533) or a joggle side 534 (including web face portions 535 and 536). The system can also receive one or more offset directions 542 and 544 and offset depth values, each generally associated with a respective web face. The selections can be received and interpreted as described above. Note that a plurality of adjacent web faces are selected for inclusion in the joggle processing, along with the corresponding bend region.

Note, in this example, the offset direction 544 (inwards) is opposite that of offset direction 444 (outwards) in FIG. 4B. Any offset direction can be input, and the corresponding offset face side is moved or transformed in the direction of the input offset direction by the input offset depth value, and corresponding runouts are added.

FIG. 5C illustrates a modified CAD model 570 including a joggle feature 571. After the system has received any user selections, the system can create a joggle feature 571 at the datum plane. In doing so, the system can transform a portion of each web face on the joggle side according to the selected offset directions and offset depth values, and create respective intersecting runouts 552 and 554 between the stationary side and joggle side of each web face and between the respective bend regions.

Figures 6A, 6B:
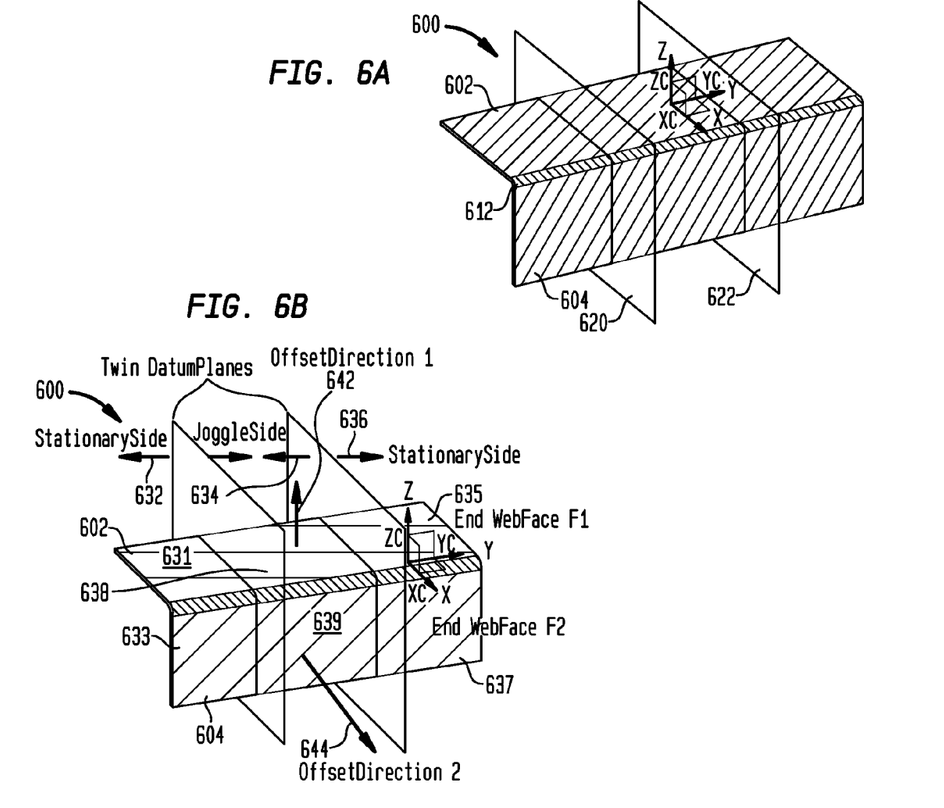
Figure 6C:
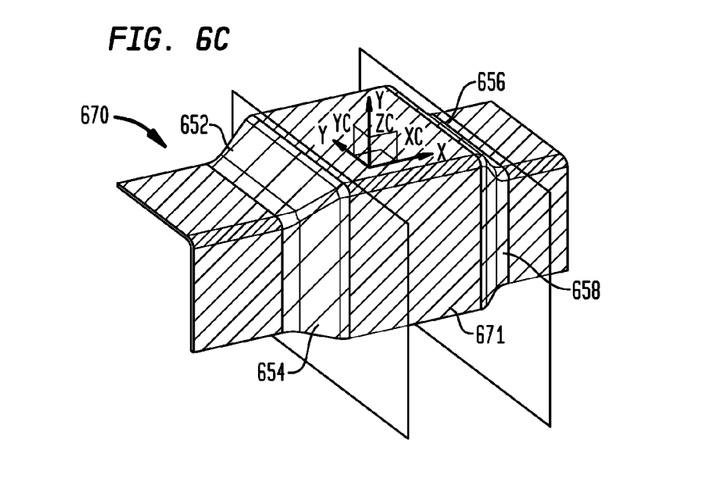

FIG. 6A illustrates a CAD model 600 to which a joggle feature is to be added. FIG. 6B illustrates user selections for the joggle feature that are received by the system. FIG. 6C illustrates a modified CAD model 670 including a joggle feature.

FIG. 6A includes the CAD model 600 having a plurality of adjacent web faces 602 and 604 connected by a bend region 612. CAD model 600 also includes twin datum planes 620 and 622, which may or may not be visible in the model.

FIG. 6B illustrates user selections that can be received by the system, including a selection of web faces 602 and 604, and stationary sides 632 (including web face portions 631 and 633) and 636 (including web face portions 635 and 637) or a joggle side 634 (including web face portions 638 and 639) automatically determined for twin datum planes. The selections can be received and interpreted as described above. The system can also receive one or more offset directions 642 and 644 and offset depth values, each generally associated with a respective web face. Note that a plurality of adjacent web faces are selected for inclusion in the joggle processing, along with the corresponding bend region.

FIG. 6C illustrates a modified CAD model 670 including a joggle feature 671. After the system has received any user selections, the system can create joggle feature 671 at the twin datum planes, using the web face portions between the datum planes as the joggle side and the web face portions outside the datum planes as the stationary side. In doing so, the system can transform a portion of each web face on the joggle side according to the selected offset directions and offset depth values, and create respective intersecting runouts 652, 654, 656, and 658 between the stationary side and joggle side of each web face and between the respective bend regions.

The examples of FIGS. 4A-6C included only end web faces connected by bend regions. Disclosed embodiments also handle intermediate web faces.

Figure 7A:
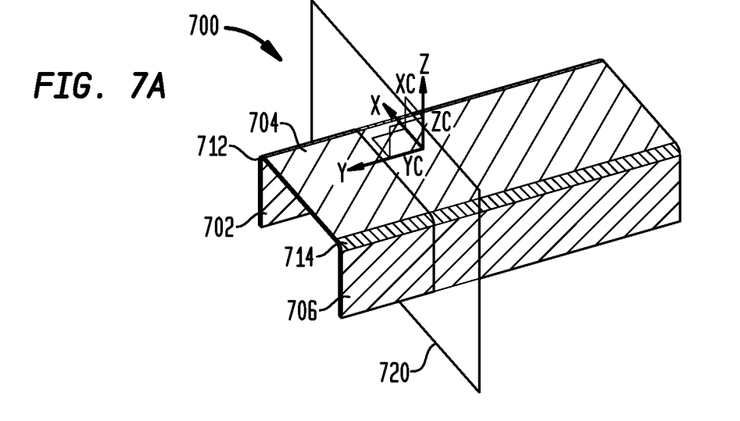
Figure 7B:
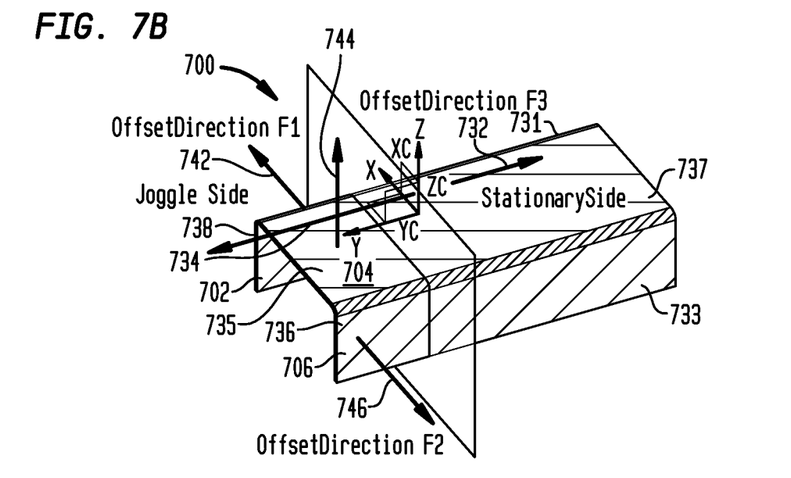
Figure 7C:
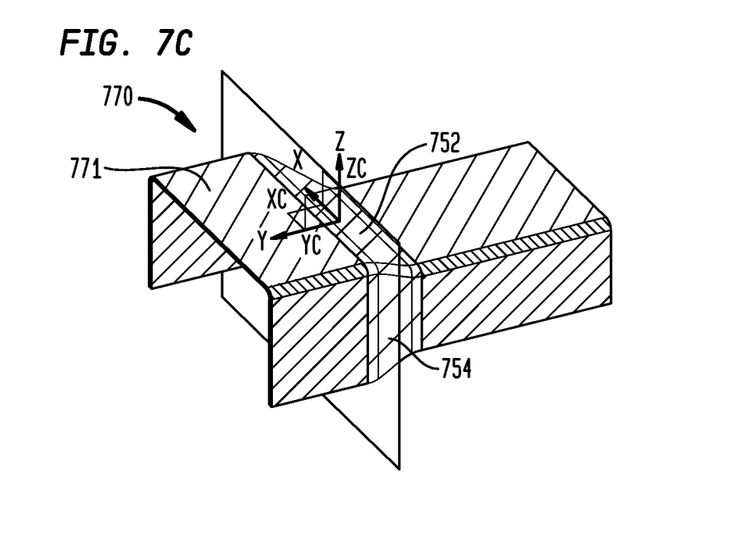

FIG. 7A illustrates a CAD model 700 to which a joggle feature is to be added. FIG. 7B illustrates user selections for the joggle feature that are received by the system. FIG. 7C illustrates a modified CAD model 770 including a joggle feature.

FIG. 7A includes the CAD model 700 having a plurality of adjacent web faces 702, 704, and 706, connected by bend regions 712 and 714. Note that web faces 702 and 706 are end web faces while web face 704 is an intermediate web face. CAD model 700 also includes a datum plane 720, which may or may not be visible in the model.

FIG. 7B illustrates user selections that can be received by the system, including a selection of web faces 702, 704 and 706, and a stationary side 732 (including portions 731, 737, and 733), or a joggle side 734 (including portions 738, 735, and 736). The selections can be received and interpreted as described above. The system can also receive one or more offset directions 742, 744, and 746 and offset depth values, each generally associated with a respective web face. Note that a plurality of adjacent web faces are selected for inclusion in the joggle processing, along with the corresponding bend region, including an intermediate web face in this example.

FIG. 7C illustrates a modified CAD model 770 including a joggle feature 771. After the system has received any user selections, the system can create joggle feature 771 at the datum plane. In doing so, the system can transform a portion of each web face on the joggle side according to the selected offset directions and offset depth values, and create respective intersecting runouts 752 and 754 between the stationary side and joggle side of each web face and between the respective bend regions (other runouts are not visible from this perspective, in web face 702).

Of course, the features and techniques illustrated in the examples herein can be combined. For example, the offset directions can be changed (inwards or outwards) to create joggle features that narrow or expand the basic shape of the features of the CAD model. The stationary side and joggle side of the datum plane can also be changed. Joggle features can be added at multiple points in a single sheet metal model, along the same or different datum planes. Multiple joggle features can be added sequentially, using the same or different datum planes, for example to create "nested" joggle features.

Figure 8A:
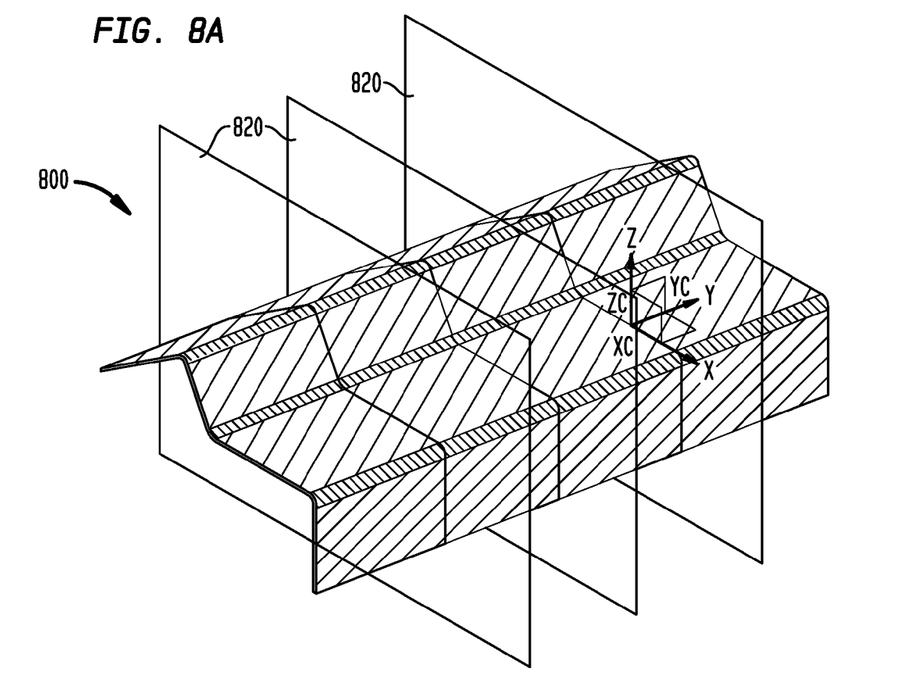
Figure 8B:
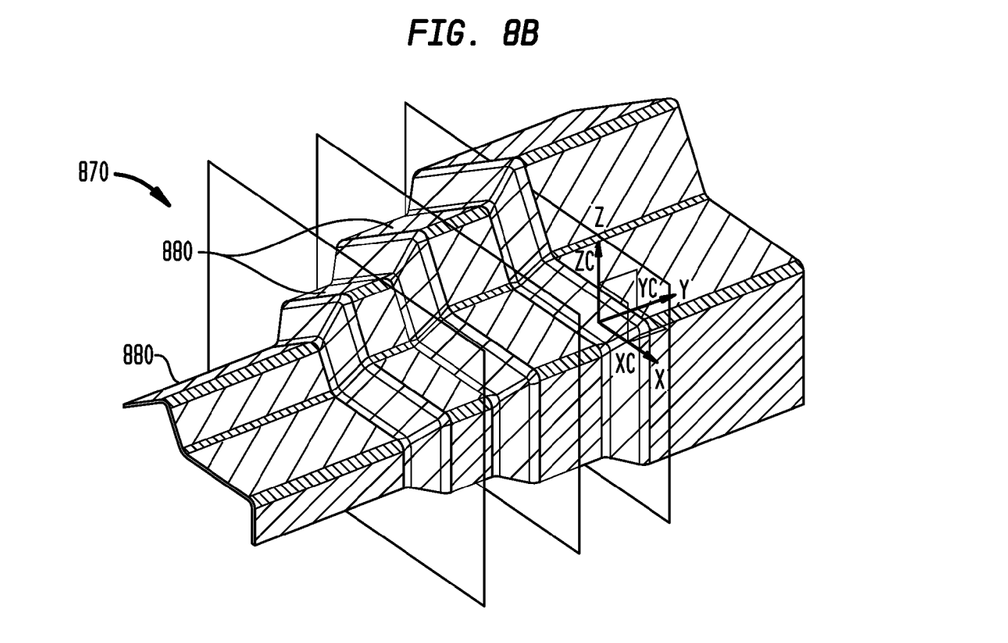

FIGS. 8A-8B illustrate an example where multiple joggle features are added. FIG. 8A illustrates a CAD model 800 including multiple datum planes 820. But successively or concurrently performing processes as described herein, multiple joggle features can be added. In this example, the plurality of selected adjacent web faces include two end faces with two intermediate faces between them.

FIG. 8B shows a modified CAD model 880, corresponding to the original CAD model 800, having multiple joggle features 870 in a nested configuration. Note that the modified CAD model 880 includes multiple intersecting runouts at each datum plane.

Figure 9A:
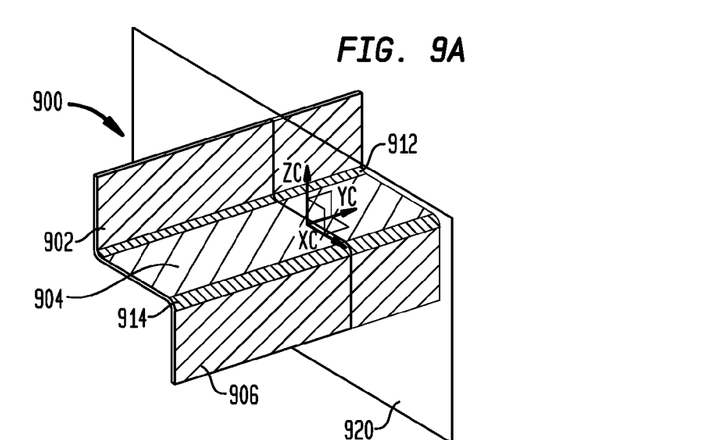
Figure 9B:
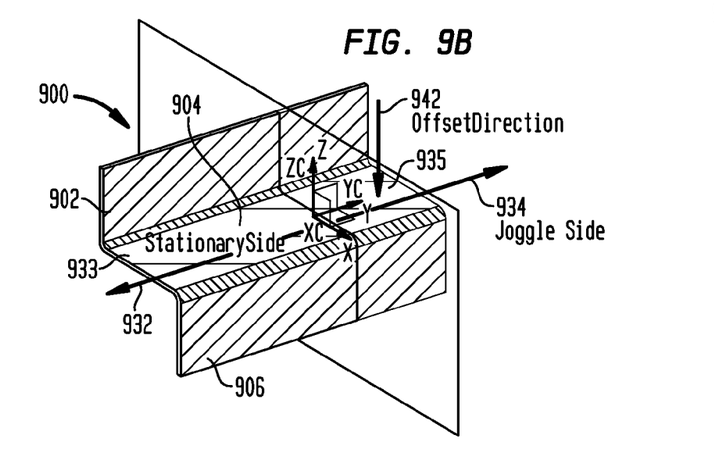
Figure 9C:
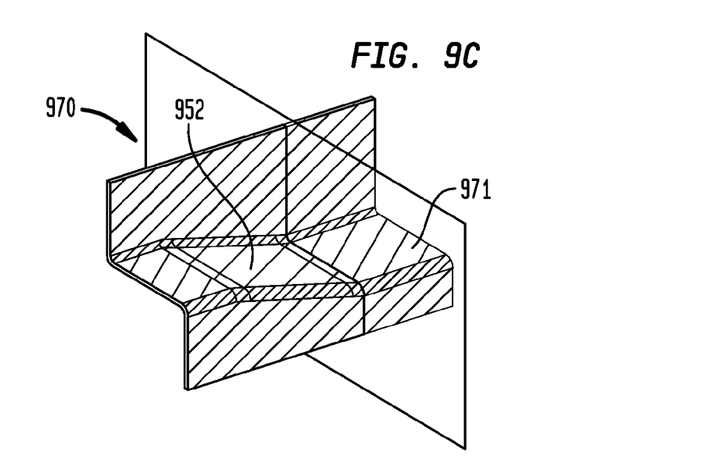

FIG. 9A illustrates a CAD model 900 to which a joggle feature is to be added. FIG. 9B illustrates user selections for the joggle feature that are received by the system. FIG. 9C illustrates a modified CAD model 970 including a joggle feature.

FIG. 9A includes the CAD model 900 having a plurality of adjacent web faces 902, 904, and 906, connected by bend regions 912 and 914. Note that web faces 902 and 906 are end web faces while web face 904 is an intermediate web face. CAD model 900 also includes a datum plane 920, which may or may not be visible in the model.

FIG. 9B illustrates user selections that can be received by the system, including a selection of web face 904, and a stationary side 932 (including portion 933) or a joggle side 934 (including portion 935). The selections can be received and interpreted as described above. The system can also receive one or more offset directions 942 with offset depth values, each generally associated with a respective web face. Note that, in this example, only the single intermediate web face 904 is selected for inclusion in the joggle processing, along with its corresponding bend regions.

FIG. 9C illustrates a modified CAD model 970 including a joggle feature 971. After the system has received any user selections, the system can create joggle feature 971 at the datum plane. In doing so, the system can transform a portion of each web face on the joggle side according to the selected offset directions and offset depth values, and create a runout 952 between the stationary side and joggle side of the web face and between the respective bend regions. Faces 902 and 906 are modified to conform to the joggle feature.

Figure 10A:
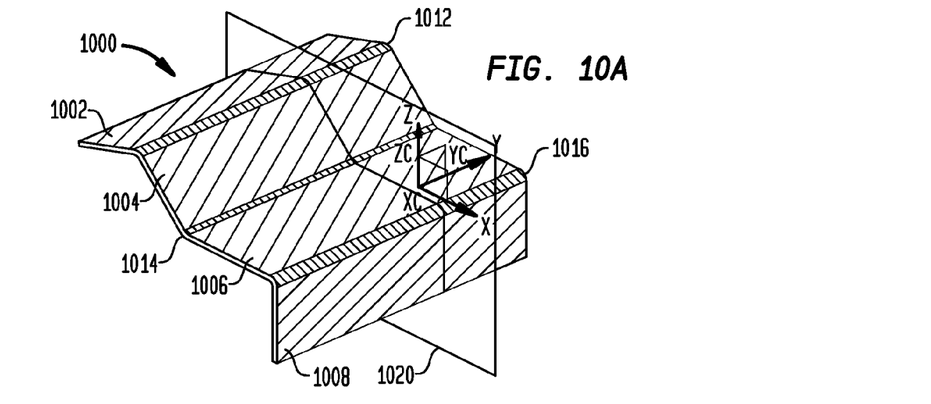
Figures 10B, 10C:
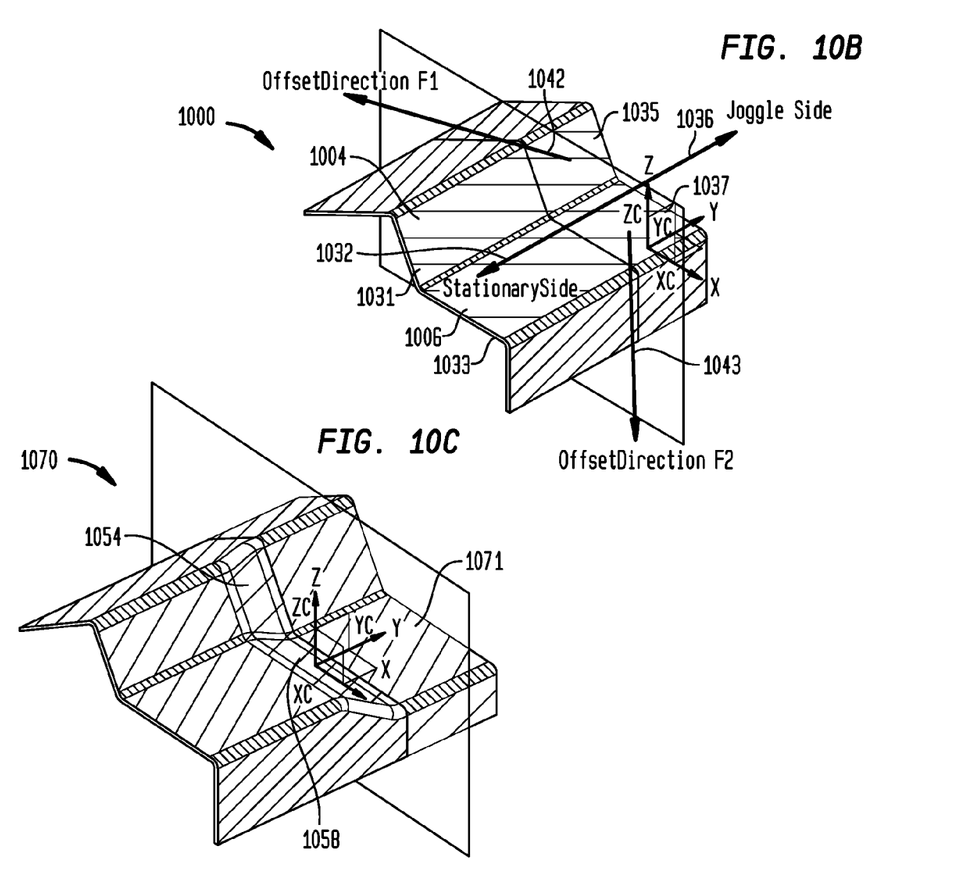

FIG. 10A illustrates a CAD model 1000 to which a joggle feature is to be added. FIG. 10B illustrates user selections for the joggle feature that are received by the system. FIG. 10C illustrates a modified CAD model 1070 including a joggle feature.

FIG. 10A includes the CAD model 1000 having a plurality of adjacent web faces 1002, 1004, 1006, and 1008 connected by bend regions 1012, 1014, and 1016. Note that web faces 1002 and 1008 are end web faces while web faces 1004 and 1006 are intermediate web faces. CAD model 1000 also includes a datum plane 1020, which may or may not be visible in the model.

FIG. 10B illustrates user selections that can be received by the system, including a selection of web faces 1004 and 1006, and a stationary side 1032 (including portions 1031 and 1033) or a joggle side 1036 (including portions 1035 and 1037). The selections can be received and interpreted as described above. The system can also receive one or more offset directions 1042 and 1043 with offset depth values, each generally associated with a respective web face. Note that a plurality of adjacent intermediate web faces are selected for inclusion in the joggle processing, along with the corresponding bend region, in this example.

FIG. 10C illustrates a modified CAD model 1070 including a joggle feature 1071. After the system has received any user selections, the system can create joggle feature 1071 at the datum plane. In doing so, the system can transform a portion of each web face on the joggle side according to the selected offset directions and offset depth values, and create intersecting runouts 1054 and 1058, between the stationary side and joggle side of each of the web faces and between the respective bend regions. Faces 1002 and 1008 are modified to conform to the joggle feature.

Figure 11A:
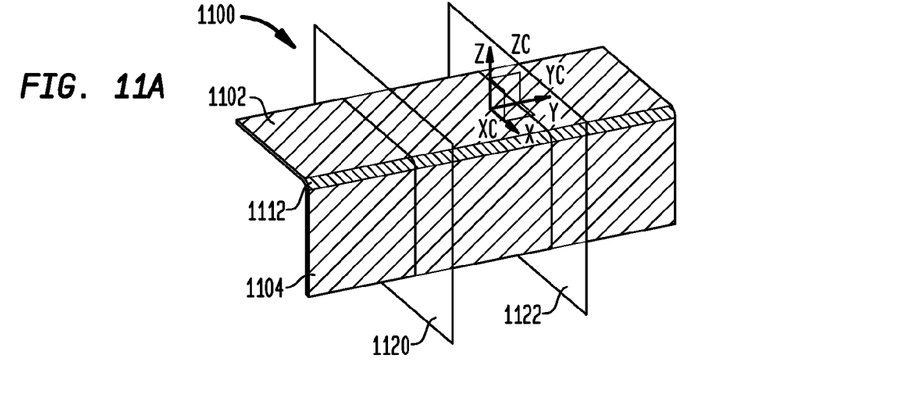
Figure 11B:
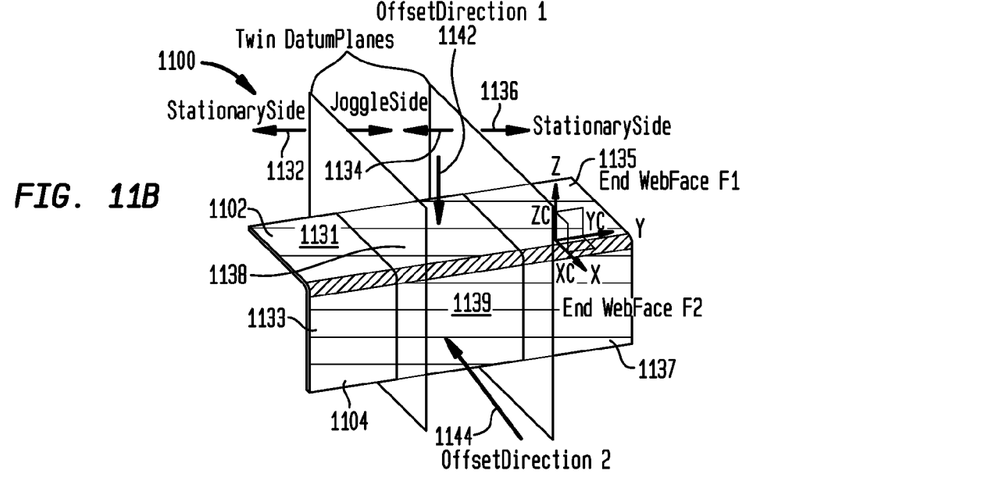
Figure 11C:
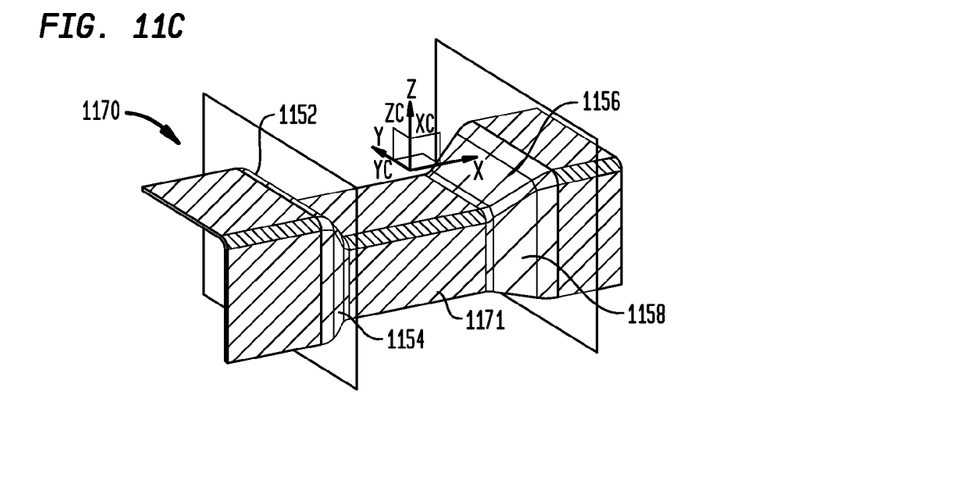

FIG. 11A illustrates a CAD model 1100 to which a joggle feature is to be added. FIG. 11B illustrates user selections for the joggle feature that are received by the system. FIG. 11C illustrates a modified CAD model 1170 including a joggle feature.

FIG. 11A includes the CAD model 1100 having a plurality of adjacent web faces 1102 and 1104 connected by a bend region 1112. CAD model 1100 also includes twin datum planes 1120 and 1122, which may or may not be visible in the model.

FIG. 11B illustrates user selections that can be received by the system, including a selection of web faces 1102 and 1104, and stationary sides 1132 (including web face portions 1131 and 1133) and 1136 (including web face portions 1135 and 1137) or a joggle side 1134 (including web face portions 1138 and 1139) automatically determined for twin datum planes. The selections can be received and interpreted as described above. The system can also receive one or more offset directions 1142 and 1144 and offset depth values, each generally associated with a respective web face. Note that a plurality of adjacent web faces are selected for inclusion in the joggle processing, along with the corresponding bend region. Note that in this example, the offset directions are opposite those illustrated in the example of FIG. 6.

FIG. 11C illustrates a modified CAD model 1170 including a joggle feature 1171. After the system has received any user selections, the system can create joggle feature 1171 at the twin datum planes, using the web face portions between the datum planes as the joggle side and the web face portions outside the datum planes as the stationary side. In doing so, the system can transform a portion of each web face on the joggle side according to the selected offset directions and offset depth values, and create respective intersecting runouts 1152, 1154, 1156, and 1158 between the stationary side and joggle side of each web face and between the respective bend regions.

Figure 12:
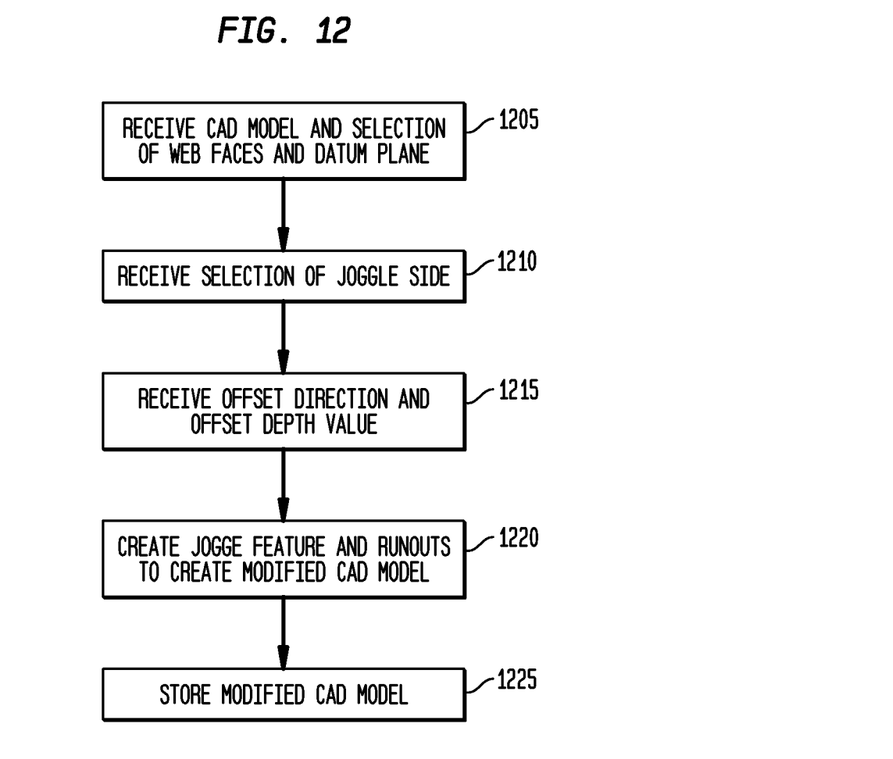
FIG. 12 illustrates a flowchart of a process in accordance with disclosed embodiments.

FIG. 12 depicts a flowchart of a process in accordance with disclosed embodiments that may be performed, for example, by one or more CAD or PDM systems as described herein, referred to generically as the "system" below.

The system receives a CAD model including a selection of at least one web face of the CAD model and at least one datum plane of the CAD model that intersects the web face (1205). "Receiving," as used herein, can include loading from storage, receiving via an interaction with a user, receiving from another device or process, or otherwise. The CAD model can be, for example, a sheet metal body. The datum plane(s) may or may not be visible in the model. The datum plane(s) must intersect the selected web face(s). Where there are multiple adjacent web faces, pairs of web faces can be connected by bend regions. The web faces can include end web faces and intermediate web faces. There can be multiple datum planes, including twin datum planes.

The system receives a selection of a joggle side with respect to the datum plane (1210). This can be implemented, for example by the system receiving a user input selection of the joggle side direction vector in the case of single datum plane. The selections can be received and interpreted as described above, including automatic selection of the joggle side and the stationary side in the case of twin datum planes. Where there are twin datum planes, the joggle side can be between the twin datum planes.

The system receives an offset direction, such as inwards or outwards, corresponding to each selected web face (1215). This also includes receiving an offset depth value corresponding to each offset direction. This can be implemented by receiving an offset direction and an offset depth value for one of a plurality of faces on the joggle side and assigning a corresponding offset direction and depth to the other faces included in the joggle side. Note that processes 1210 and 1215 can be combined in some embodiments, for example where the offset direction is received that also indicates the selection of the joggle side and may also indicate a depth value.

The system creates at least one joggle feature in the CAD model, to create a modified CAD model, by moving each of the portions on the joggle side of the selected web faces, along with any associated bend regions, according to the respective offset directions and offset depth values (1220). This can include performing any necessary transforms to move each of the portions on the joggle side of the selected web faces while maintaining the bend regions between them. This step also includes creating at least one runout for each selected web face at the datum plane, corresponding to each moved portion of the selected web faces. The runouts can include runout faces and bend regions that connect the offset portions and the corresponding stationary portions of the web faces that are now split into separate faces. The runouts can be created at the respective datum planes. The runouts can be intersecting runouts.

The steps above can be performed multiple times, concurrently or sequentially, to produce nested or multiple joggle features. Multiple or nested joggle features can be considered together as a single multi-level joggle feature. Of course, the system can also automatically modify other portions of the CAD model in accordance with the joggle feature and runouts as may be required by any constraints, dependencies, or other conditions.

The system stores the modified CAD model (1225), including the joggle features, runouts, and other features described herein.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method performed by a data processing system and comprising:
   receiving a CAD model including a selection of multiple adjacent web faces of the CAD model and at least one datum plane of the CAD model that intersects the web faces;
   receiving a selection of a joggle side of the CAD model with respect to the datum plane;
   receiving an offset direction and an offset depth value corresponding to each selected web face;
   creating at least one joggle feature in the CAD model by moving a portion of each of the selected web faces on the joggle side of the CAD model according to the respective offset directions and the depth values, including creating at least one runout for each selected web face at the datum plane, to produce a modified CAD model; and
   storing the modified CAD model.

2. The method of claim 1, wherein selected web faces include at least one intermediate web face.

3. The method of claim 1, wherein the datum plane intersects the web face, and the portion of the web face on the opposite side of the datum plane from the joggle side is designated as a stationary portion.

4. The method of claim 1, wherein the CAD model includes twin datum planes, and the joggle side is automatically determined as the portion of the web face between the twin datum planes.

5. The method of claim 1, wherein the modified CAD model includes a bend region connecting two of the moved portions of the selected adjacent web faces.

6. The method of claim 1, wherein creating at least one runout for the joggle feature includes creating intersecting runouts for multiple adjacent web faces.

7. The method of claim 1, wherein the selected web faces include end web faces and at least one intermediate web face.

8. A data processing system comprising:
   a processor; and
   an accessible memory, the data processing system particularly configured to
      receive a CAD model including a selection of multiple adjacent web faces of the CAD model and at least one datum plane of the CAD model that intersects the web faces;
      receive a selection of a joggle side of the CAD model with respect to the datum plane;
      receive an offset direction and an offset depth value corresponding to each selected web face;
      create at least one joggle feature in the CAD model by moving a portion of each of the selected web faces on the joggle side of the CAD model according to the respective offset directions and the depth values, including creating at least one runout for each selected web face at the datum plane, to produce a modified CAD model; and
      store the modified CAD model.

9. The data processing system of claim 8, wherein selected web faces include at least one intermediate web face.

10. The data processing system of claim 8, wherein the datum plane intersects the web face, and the portion of the web face on the opposite side of the datum plane from the joggle side is designated as a stationary portion.

11. The data processing system of claim 8, wherein the CAD model includes twin datum planes, and the joggle side is automatically determined as the portion of the web face between the twin datum planes.

12. The data processing system of claim 8, wherein the modified CAD model includes a bend region connecting two of the moved portions of the selected adjacent web faces.

13. The data processing system of claim 8, wherein creating at least one runout for the joggle feature includes creating intersecting runouts for multiple adjacent web faces.

14. The data processing system of claim 8, wherein the selected web faces include end web faces and at least one intermediate web face.

15. A non-transitory computer-readable medium encoded with executable instructions that, when executed, cause one or more data processing systems to:
   receive a CAD model including a selection of multiple adjacent web faces of the CAD model and at least one datum plane of the CAD model that intersects the web faces;
   receive a selection of a joggle side of the CAD model with respect to the datum plane;
   receive an offset direction and an offset depth value corresponding to each selected web face;
   create at least one joggle feature in the CAD model by moving a portion of each of the selected web faces on the joggle side of the CAD model according to the respective offset directions and the depth values, including creating at least one runout for each selected web face at the datum plane, to produce a modified CAD model; and
   store the modified CAD model.

16. The computer-readable medium of claim 15, wherein selected web faces include at least one intermediate web face.

17. The computer-readable medium of claim 15, wherein the datum plane intersects the web face, and the portion of the web face on the opposite side of the datum plane from the joggle side is designated as a stationary portion.

18. The computer-readable medium of claim 15, wherein the CAD model includes twin datum planes, and the joggle side is automatically determined as the portion of the web face between the twin datum planes.

19. The computer-readable medium of claim 15, wherein the modified CAD model includes a bend region connecting two of the moved portions of the selected adjacent web faces.

20. The computer-readable medium of claim 15, wherein creating at least one runout for the joggle feature includes creating intersecting runouts for multiple adjacent web faces.

\* \* \* \* \*